United States Patent [19]
Mathews

[11] Patent Number: 5,415,593
[45] Date of Patent: May 16, 1995

[54] DRIVE POWER TRANSMISSION ELEMENT

[76] Inventor: Frederic Mathews, 604 S. Adams St., Mount Pleasant, Iowa 52641

[21] Appl. No.: 64,903

[22] Filed: May 24, 1993

[51] Int. Cl.⁶ .......................................... F16H 55/36
[52] U.S. Cl. ..................................... 474/174; 474/175
[58] Field of Search ............... 474/166, 167, 174, 175, 474/176, 188, 189, 153, 152

[56] References Cited
U.S. PATENT DOCUMENTS

| | | | |
|---|---|---|---|
| 2,176,335 | 10/1939 | Gray | 474/175 |
| 3,844,537 | 10/1974 | Rinio | 474/175 X |
| 4,077,271 | 3/1978 | Mathews | 474/175 |
| 5,205,793 | 4/1993 | Mathews | 474/175 |

Primary Examiner—Michael Powell Buiz
Attorney, Agent, or Firm—James C. Nemmers

[57] ABSTRACT

A drive power transmission element in which a wheel has a peripheral surface provided with a unique groove structure for receiving a power transmission element such as a drive belt, rope, cable, or other compressible element. The wheel is provided with a groove having a particular configuration in the shape of a trochoidal curve. Since the compressible element or belt is of a compressible material, the drive belt or compressible element will be compressed into the groove of the drive wheel so that it is driven by compression of the belt or element, not friction.

10 Claims, 2 Drawing Sheets

DRIVE POWER TRANSMISSION ELEMENT

BACKGROUND OF THE INVENTION

The invention relates to a power transmission system in which a specially designed wheel and a compressible drive belt or element engaged in the periphery of the wheel will provide a positive drive regardless of the direction of rotation of the wheel.

Transmission of power by using a flexible and usually endless power transmission element, such as a drive belt or rope, has been used for many years. The conventional drive uses pulleys each of which has a V-shaped groove in which is engaged a V-shaped belt. These belt and pulley systems will transmit power by frictional engagement between the belt and pulley. Since slippage frequently occurs between the drive belt and pulleys when a load is applied, various techniques have been used to increase the friction between the pulleys and belts. Even with these improved techniques that increase the friction and reduce slippage, the frictional forces between the pulleys and drive belt are not sufficient to eliminate the slippage that will occur when a sufficiently high load is applied.

My prior U.S. Pat. No. 4,077,271 discloses a unique design in which the drive wheel has a peripheral surface provided with a plurality of circumferentially spaced impressions for receiving a drive belt or rope. This particular design of my prior patent utilizes a compressible rope or belt that becomes locked in the impressions of the wheel with a resistance equal to the load which is being applied without relying upon friction between the wheel and belt. Slippage in my prior design is eliminated by compression of the drive belt or rope. However, the prior design is expensive to manufacture because of the precise configuration of the impressions in the drive wheel. Moreover, because of the irregular thickness around the circumference of the wheel, the wheel has less dynamic balance and more vibration is produced on the belt by reason of pulses produced during the locking and unlocking of the belt. The vibration in some applications is not desirable, and in addition, the continuous locking and unlocking of the drive belt and drive element produces more rapid wear on the belt.

It is therefore a principal object of the invention to provide an improved design for a drive wheel and drive belt which utilizes compression, rather than friction, and which minimizes vibration and wear and is economical to manufacture.

SUMMARY OF THE INVENTION

The drive wheel of the invention is provided with a groove having a configuration in the shape of a trochoidal curve on at least one side of the groove. The groove is wider at the top, and since the drive element or belt is of a compressible material, the drive belt will be compressed into the groove of the drive wheel so that it is driven by compression of the belt, not by frictional contact. Once the specific trochoidal curve configuration of the groove in the drive wheel is determined for a particular application, the wheel can be simply manufactured with standard machines and without the necessity of maintaining machinist's tolerances.

DESCRIPTION OF THE PREFERRED EMBODIMENTS OF THE INVENTION

Figure 1:
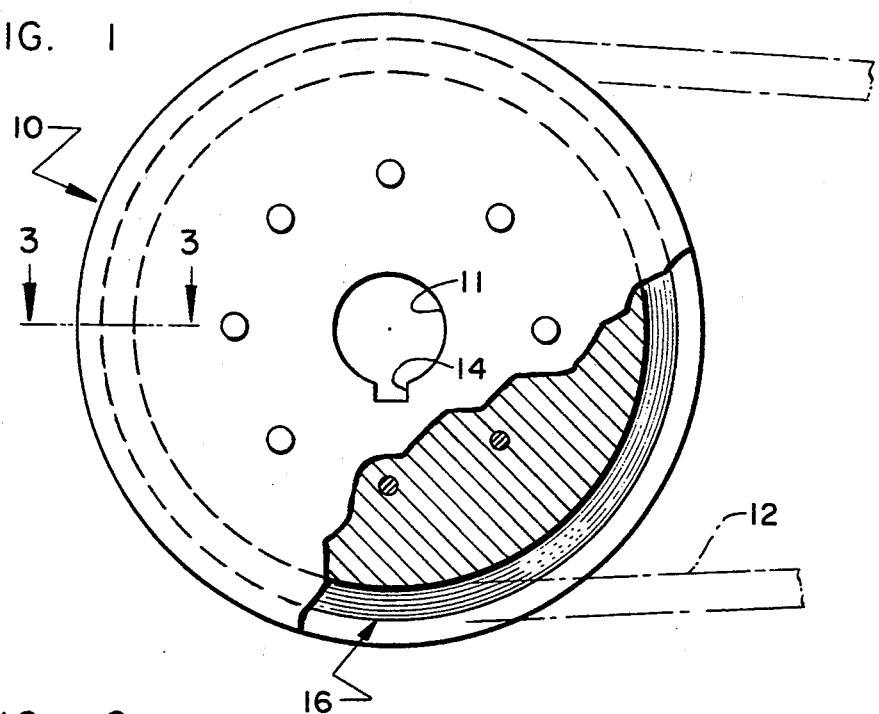
FIG. 1 is a side elevational view of a wheel and belt constructed utilizing the principles of the invention.
Figure 2:
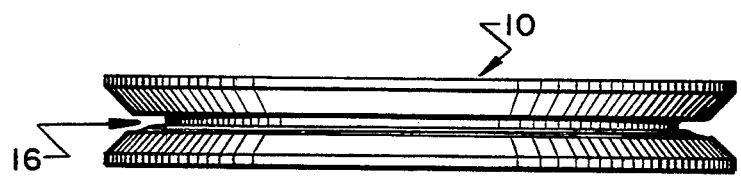
FIG. 2 is a view of an edge of a drive wheel illustrating a first embodiment of the invention.

Referring first to FIGS. 1 and 2, a power transmission system utilizing the principles of the invention includes a drive wheel, indicated generally by the reference numeral 10, which has a central opening 11 for mounting the wheel 10 on a shaft or axle (not shown). The opening 10 may include a keyway 14 for receiving a key (not shown) that locks the wheel 10 to the shaft or axle so that power may be transmitted from the wheel 10 to the shaft. The wheel 10 has formed around its entire circumference a groove, indicated generally by the reference numeral 16, for receiving a drive belt 12. The drive belt 12 is of any suitable material that is flexible and sufficiently compressible so that when compressed into the groove 16 it will occupy the full width and depth of the groove 16. This is described more fully hereinafter.

Figure 3:
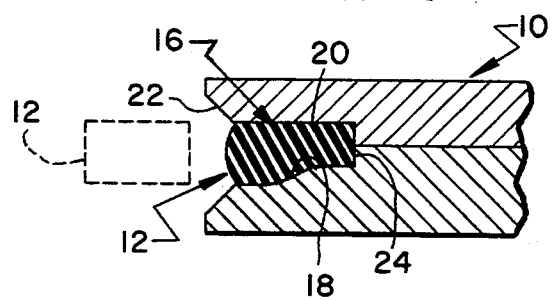
FIG. 3 is a sectional view of a portion of the drive wheel of the first embodiment taken on the line 3—3 of FIG. 1.
Figure 4:
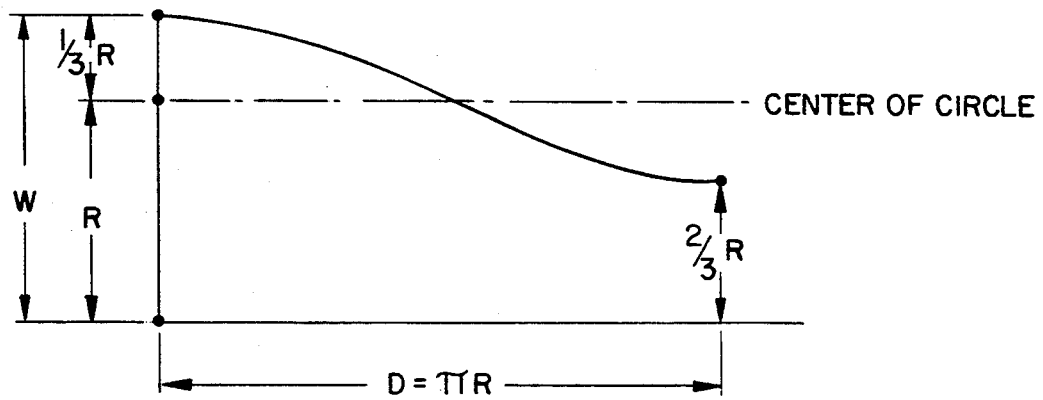
FIG. 4 is a diagram illustrating the design principles used in determining the configuration of the groove structure of the first embodiment.

Referring now to FIGS. 3 and 4, there is illustrated the specific configuration of the groove 16 for a first embodiment of the invention. As best seen in FIG. 3, the cross-sectional shape of the groove 16 in the wheel 10 is formed in the shape of a trochoidal curve along one side 18 of the groove 16 while the other side 20 of the groove 16 is straight. It should be understood, however, that the side 20 may be of differing configurations, such as straight, bevelled or curved, depending upon the particular application for the wheel. The configuration of the first embodiment of FIG. 3 and the configuration of the second embodiment of FIG. 5 are the preferred embodiments.

A trochoidal curve is one that is traced by a point on the perpendicular radius of a circle as the circle rolls without slipping along a straight line through 360°. The portion of a trochoidal curve used to determine the configuration of the side 18 of the groove 16 in the wheel 10 of the invention is the curve generated from a point on the radius of a circle at least one-third ($\frac{1}{3}$) of the distance from the center of the circle as the circle rolls from a position where that radius is vertical through 180°. This is illustrated in the diagram of FIG. 4 of the drawings where "R" is the radius of the circle, "W" is 4/3R and "D" is the distance traveled by a point on the circumference of the circle as the circle rolls through 180°, this distance D being one-half of the circumference of the circle or $\pi R$. Therefore, the ratio of W:D is 4/3R:$\pi R$ or unity to $\frac{3}{4}\pi$. As illustrated in FIG. 3, this configuration results in a groove 16 that is wider at the top 22 and narrower at the bottom 24, and the ratio of the width "W" of the top 22 to its depth "D" is unity to $\frac{3}{4}\pi$. The cross-sectional shape of groove 16 as illustrated in FIG. 3 and described herein extends around the entire periphery of the wheel 10.

Figure 5:
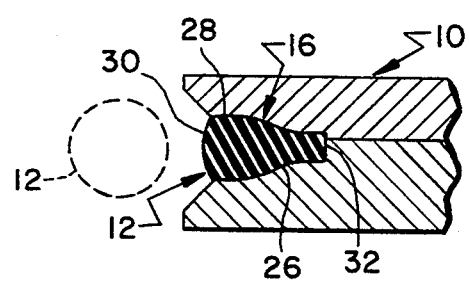
FIG. 5 is a sectional view similar to FIG. 3 but illustrating a second embodiment of the invention.
Figure 6:
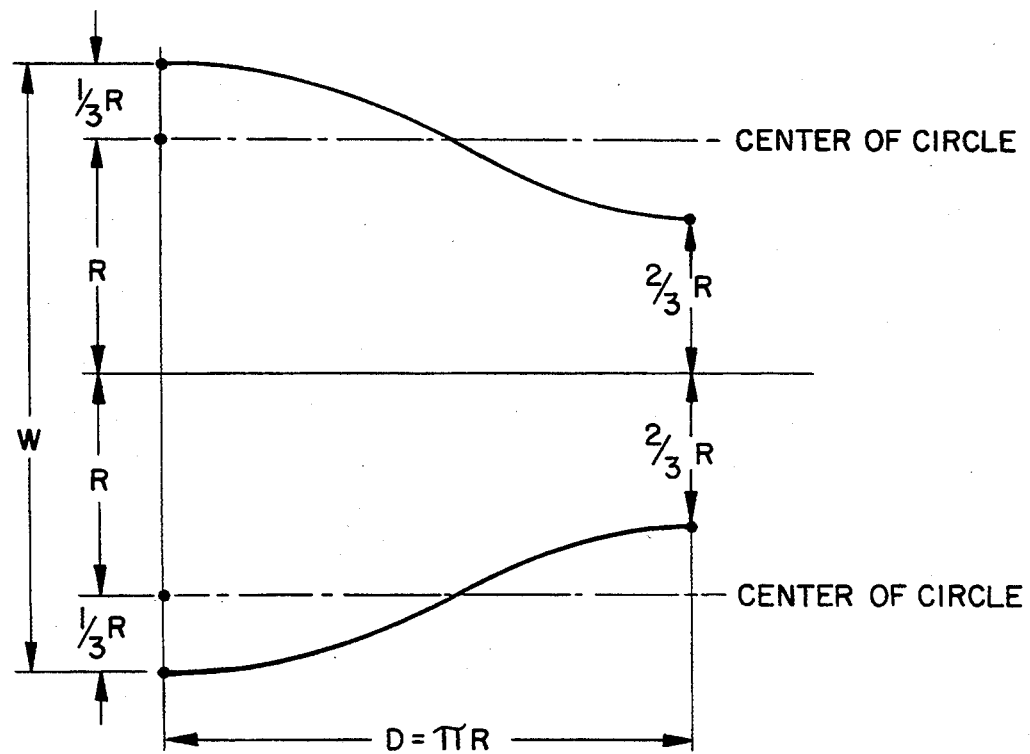
FIG. 6 is a diagram illustrating the design principles used in determining the configuration of the groove structure of the second embodiment of FIG. 5.

In the embodiment of FIG. 5, the groove 16 is formed with a trochoidal curve along both sides 26 and 28 producing a groove 16 that is wider at the top 30 and narrower at the bottom 32. In the embodiment of FIG. 5, however, the ratio of the width "W" of the top 30 to the depth "D" of groove 16 is unity to $\frac{3}{8}\pi$ which is determined as illustrated by the diagram of FIG. 6 of the drawings. In FIG. 6, the two trochoidal curves are each generated by the line traced by a point on the radius of a circle as the circle rolls without slipping through 180° along the baseline "B". One trochoidal curve is generated by a point on the radius "R" located $\frac{1}{3}$R above the center of the circle while the other trochoidal curve is generated by a point on radius "R" located $\frac{1}{3}$R below the center of a circle beneath the baseline B. The distance "D" traveled by the circle along the baseline B as the circle rolls 180° is one-half the circumference or $\pi$R. The distance "W" is 4/3R plus 4/3R or 8/3R, and the ratio W:D is 8/3R:$\pi$R or unity to $\frac{3}{8}\pi$. Thus, in the embodiment of FIG. 5, the ratio of the width "W" of the top 30 to the depth "D" of groove 16 is unity to $\frac{3}{8}\pi$. As in the first embodiment of FIG. 3, this groove 16 extends around the entire periphery of the wheel 10.

Thus, in either of the two embodiments of the invention illustrated herein, the configuration of the trochoidal curve used in determining the configuration of side 18 (FIG. 3) or sides 26 and 28 (FIG. 5) is generated by a point that is on the radius R a distance of $\frac{1}{3}$R from the center of the circle used in generating the curve. This then determines the width-to-depth ratio of the groove 16. The distance of $\frac{1}{3}$R is a minimum distance and the ideal distance, but distances of greater than $\frac{1}{3}$R can be used depending upon the nature and compressibility of the drive belt 12. Distances less than $\frac{1}{3}$R will work, but $\frac{1}{3}$R is the practical limit since such lesser distances will produce a trochoidal curve that is too "flat" resulting in the belt 12 not being sufficiently compressed to carry the required load. Also, a distance of 3R/3 (or simply "R") will not function since the point used in generating the curve will now produce a cycloid rather than a trochoid, and the cycloid will not work as the configuration for the groove 16 of the wheel 10.

The cross-sectional shape of the drive belt 12 can be of any suitable shape, round, V-shaped, or shaped to the same cross-sectional shape as the groove 16. In the embodiment of FIG. 3, there has been illustrated a belt 12 of rectangular cross-section. To function with the maximum efficiency, the width to depth ratio of the belt 12 should also be unity to $\frac{3}{8}\pi$. In the embodiment of FIG. 5, there has been illustrated a belt 12 having a circular cross-sectional shape. Preferably, the diameter of the belt 12 should be approximately 1¼W, i.e., one-and-on-fourth of the width of the top of the groove 16 as shown in FIG. 5. In either of the embodiments, the determining criteria for the size of belt 12 is that when compressed into the groove 16, the belt 12 must occupy the full depth of the groove 16 and be in complete contact with both sides of the groove 16. Therefore, the size and shape of the belt 12 will in part depend upon the material from which it is made and the application of the drive system in which it is used. For example, in applications where high speeds are employed, a circular cross-sectional shape is ideal in order to reduce vibration with maximum strength. In other applications at lower speeds, a rectangular shape or V-belt may be more suitable.

In use, as load is applied to the drive system, the belt 12 will compress into the groove 16 of the wheel 10 and provide a positive drive and increased load capacity. The belt 12 will not slip because it is not dependent upon friction, but only upon compression, and the higher the load applied to the system, the more the belt 12 will be compressed. Because the belt 12 stretches and compresses, the drive system can tolerate variable loads very easily without producing vibration. Even though the belt 12 compresses and decompresses, because of the shape of the groove 16, less vibration is produced in any application regardless of the cross-sectional shape of the belt 12, and better dynamic balances are therefore produced at high speeds.

Because of the shape of the groove 16 which is constant in cross-section around the entire periphery of the wheel 10, the wheel can be easily and economically manufactured since it can be turned on a lathe. Once the precise dimensions of the groove 16 are determined using the principles of the invention as described herein, the manufacturing process is relatively simple and economical and machinist's tolerances are not required.

Since the drive system of the invention is dependent upon compression and not friction, as the load of the system increases, the amount of load that can be transmitted also increases. In addition, variable loads are handled with ease and without the vibration inherent in prior art drive systems. Also, the design of the groove 16 in wheel 10 and the belt 12 permits the belt 12 to properly track and climb. In other words, if the two wheels in a drive system of the invention are not properly aligned, the belt will still track, whereas if a chain and sprocket are out of alignment, although providing a positive drive, misalignment may cause the chain to ride off the sprocket. Moreover, the belt 12 will climb and therefore tend to follow around the wheel 10 regardless of the load. Since the belt 12 is flexible and elastic, it will not break as easily as a chain in a prior art positive drive system, particularly when used in applications for variable loads.

Obviously, the drive system of the invention has many applications where positive drive is required. It is especially useful in heavy load applications and those where variable loads are produced. Also, if power must be transmitted over a very long distance, the drive system of the invention will transmit the power efficiently because slippage will be eliminated. The drive system of the invention therefore has many applications, including uses in mining applications, agricultural applications where power transmission is required over long distances, rock crushers, etc. The principles of the invention are also applicable to variable speed drives. Obviously, the invention is applicable and useful with belts of any compressible material regardless of the cross-sectional shape. Belts of standard cross-sectional shape can therefore be used.

Having thus described the invention in connection with the preferred embodiment thereof, it will be evident to those skilled in the art that various revisions and modifications can be made to the preferred embodiments described herein without departing from the spirit and scope of the invention. It is my intention, however, that all such revisions and modifications that are obvious to those skilled in the art, will be included within the scope of the following claims.

What is claimed is as follows:

1. A drive power transmission system comprising a circular wheel adapted for rotation about an axis, said wheel having a groove extending around its periphery and radially inwardly toward its axis, said groove throughout its entire length being defined by spaced apart sides with at least one of the sides in cross-section being the configuration of a trochoidal curve with the width of the groove between the sides being the greatest at the periphery of the wheel, and a flexible compressible drive element engageable in said groove to transmit power to or from the wheel, the drive element being compressed by the trochoidal curve configuration of the groove so as to lock the element and wheel in relation to each other when a load is transmitted therebetween.

2. The drive power transmission system of claim 1 in which both sides of the groove are the configuration of a trochoidal curve in cross-section.

3. The drive power transmission system of claim 1 in which the side of the groove that is the configuration of a trochoidal curve is that portion of a trochoidal curve generated from a point on the radius of a circle at least one-third of the distance from the center of the circle as the circle rolls from a position where the radius is vertical through 180°, the other side being straight.

4. The drive power transmission system of claim 3 in which the ratio of the greatest width of the groove to its depth is unity to $\frac{3}{4}\pi$.

5. The drive power transmission system of claim 2 in which the sides of the groove are each the configuration of a portion of a trochoidal curve generated from a point on the radius of a circle at least one-third of the distance from the center of the circle as the circle rolls from a position where the radius is vertical through 180°.

6. The drive power transmission system of claim 5 in which the ratio of the greatest width of the groove to its depth is unity to $\frac{3}{8}\pi$.

7. The drive power transmission system of claim 3 in which the drive element is rectangular in cross section.

8. The drive power transmission system of claim 4 in which the drive element is rectangular in cross section and the width to depth ratio of the drive element is unity to $\frac{3}{4}\pi$.

9. The drive power transmission system of claim 5 in which the drive element is circular in cross section.

10. The drive power transmission system of claim 6 in which the drive element is circular in cross section and the diameter of the drive element is approximately $1\frac{1}{4}$ times the width of the groove.

* * * * *